US012540053B2

(12) United States Patent
Miyajima et al.

(10) Patent No.: US 12,540,053 B2
(45) Date of Patent: Feb. 3, 2026

(54) ELEVATOR SYSTEM WITH CABIN DIVIDER

(71) Applicant: Otis Elevator Company, Farmington, CT (US)

(72) Inventors: Hiromitsu Miyajima, Chiba (JP); Atsushi Yamada, Narita (JP); Keiji Hashimoto, Chiba (JP)

(73) Assignee: OTIS ELEVATOR COMPANY, Farmington, CT (US)

( * ) Notice: Subject to any disclaimer, the term of this patent is extended or adjusted under 35 U.S.C. 154(b) by 969 days.

(21) Appl. No.: 17/717,771

(22) Filed: Apr. 11, 2022

(65) Prior Publication Data

US 2023/0322523 A1 Oct. 12, 2023

(51) Int. Cl.

| | |
|---|---|
| ***B66B 13/14*** | (2006.01) |
| ***B66B 9/00*** | (2006.01) |
| ***B66B 11/02*** | (2006.01) |
| ***B66B 13/30*** | (2006.01) |

(52) U.S. Cl.

CPC .............. *B66B 13/146* (2013.01); *B66B 9/00* (2013.01); *B66B 11/024* (2013.01); *B66B 13/308* (2013.01)

(58) Field of Classification Search

CPC ....... B66B 13/146; B66B 9/00; B66B 11/024; B66B 13/308; B66B 11/0226

USPC .......................................................... 187/317

See application file for complete search history.

(56) References Cited

U.S. PATENT DOCUMENTS

2002/0134623 A1* 9/2002 Kamimura .............. B66B 1/425 187/291
2022/0380175 A1* 12/2022 Herkel .................. B66B 13/146

FOREIGN PATENT DOCUMENTS

JP H0826631 A 1/1996
JP 2005255338 A 9/2005
JP 2008063043 A 3/2008

OTHER PUBLICATIONS

Yamada (JP 2005255338 A) Elevator Device and Car Used in It (Year: 2005).*
Hashimoto (JP 2008063043 A) Elevator Device (Year: 2008).*
Kimura et al. (JP H0826631 A) Vertical Transport Device (Year: 1996).*
Extended European Search Report issued in European Application No. 22208427; dated Jul. 18, 2023; 12 pages.

* cited by examiner

*Primary Examiner* — Jorge L Carrasquillo

(74) *Attorney, Agent, or Firm* — CANTOR COLBURN LLP

(57) ABSTRACT

An elevator system, having: an elevator car, the elevator car including: a front end that includes a front doorway; an aft end that includes an aft doorway; and a cabin extending from the front end to the aft end; and a divider system operationally coupled to the elevator car within the cabin, intermediate the front and aft ends, that is operational to transition between: a retracted state, where the cabin is undivided; and a deployed state where the divider system divides the cabin into a front zone that is accessible by the front doorway and an aft zone that is accessible by the aft doorway.

19 Claims, 7 Drawing Sheets

ELEVATOR SYSTEM WITH CABIN DIVIDER

BACKGROUND

The embodiments are directed to elevator systems and more specifically to an elevator system with a cabin divider.

Elevator passengers may be resistant to travel with robots, other passengers with pets, and the like. There is a need to provide an elevator system that can enable passengers to travel comfortably in these situations in the elevator car.

BRIEF SUMMARY

Disclosed is an elevator system, including: an elevator car, the elevator car including: a front end that includes a front doorway; an aft end that includes an aft doorway; and a cabin extending from the front end to the aft end; and a divider system operationally coupled to the elevator car within the cabin, intermediate the front and aft ends, that is operational to transition between: a retracted state, where the cabin is undivided; and a deployed state where the divider system divides the cabin into a front zone that is accessible by the front doorway and an aft zone that is accessible by the aft doorway.

In addition to one or more of the above disclosed aspects of the system, or as an alternate, the system includes a controller onboard the elevator car, operationally coupled to the divider system and configured to control the divider system to transition between the deployed state and the retracted state.

In addition to one or more of the above disclosed aspects of the system, or as an alternate, one of the zones includes a sensor operationally coupled to the controller and other one of the zones includes a video display that is operationally coupled to the controller, and the controller is configured to control the sensor and display so that, when the divider system is deployed, images or video captured from the one of the zones is displayed in the other one of the zones via the display.

In addition to one or more of the above disclosed aspects of the system, or as an alternate, the divider system includes a transparent portion to provide persons in one of the zones with visual access to the other one of the zones when the divider system is deployed.

In addition to one or more of the above disclosed aspects of the system, or as an alternate, wherein the cabin includes a first sidewall and a second sidewall; and the divider system includes: a first door operationally coupled to the first sidewall; and a second door operationally coupled to the second sidewall.

In addition to one or more of the above disclosed aspects of the system, or as an alternate, the controller is configured to: transition the divider system to the deployed state from the retracted state upon rendering a determination that a first trigger condition is met; and transition the divider system to the retracted state from the deployed state upon rendering a determination that a second trigger condition is met.

In addition to one or more of the above disclosed aspects of the system, or as an alternate, the controller is configured to determine one or more of: the first trigger condition is met when a pet or robot enters the elevator car; or the second trigger condition is met when one or more of a passenger count, furniture, equipment or personal belongings that are larger than a predetermined size enters the elevator car.

In addition to one or more of the above disclosed aspects of the system, or as an alternate, the controller is configured to receive data from one or more of: a sensor onboard the elevator car or at a landing, operationally connected to the controller; or a wireless network that is communicatively coupled with the controller; and the controller is configured to: render a determination from the data of whether the first or second trigger conditions are met.

In addition to one or more of the above disclosed aspects of the system, or as an alternate, the controller is configured to: determine from the data received over the wireless network that the first or second trigger conditions will be met at a landing prior to stopping at the landing; and transition the divider system to the deployed state or the retracted state when, or prior to, stopping at the landing, responsive to the determination.

In addition to one or more of the above disclosed aspects of the system, or as an alternate, the controller is operationally coupled to the front and aft doors and configured to prevent more than one of the front and aft doors from opening at a landing when the divider system is in the retracted state.

In addition to one or more of the above disclosed aspects of the system, or as an alternate, the doors include seals around their respective perimeters; the front and aft zones of the elevator car respectively include front and aft balanced ventilation systems that are operationally controlled by the controller, wherein the controller is configured to operate the front and aft balanced ventilation systems when the divider system is in the deployed state.

Further disclosed is a method of operating an elevator system with a controller operationally connected to an elevator car, the method including: controlling a divider system onboard the elevator car, within a cabin of the elevator car, between a front end having a front doorway and an aft end having an aft doorway, to transition between a deployed state and a retracted state, wherein in the retracted state, the cabin is undivided; and in the deployed state, the divider system divides the cabin into a front zone that is accessible by the front doorway and an aft zone that is accessible by the aft doorway.

In addition to one or more of the above disclosed aspects of the method, or as an alternate, the method includes controlling the divider system includes controlling a first door operationally coupled to a first sidewall of the cabin, and a second door operationally coupled to a second sidewall of the cabin.

In addition to one or more of the above disclosed aspects of the method, or as an alternate, controlling the divider system includes: transitioning the divider system to the deployed state from the retracted state upon rendering a determination that a first trigger condition is met; and transitioning the divider system to the retracted state from the deployed state upon rendering a determination that a second trigger condition is met.

In addition to one or more of the above disclosed aspects of the method, or as an alternate, controlling the divider system includes: rendering a determination that the first trigger condition is met when a pet or robot enters the elevator car; and rendering a determination that the second trigger condition is met when one or more of a passenger count, furniture, equipment or personal belongings that are larger than a predetermined size enters the elevator car.

In addition to one or more of the above disclosed aspects of the method, or as an alternate, controlling the divider system includes: receiving data, from one or more of: a sensor onboard the elevator car or at a landing that is operational coupled to the controller; a network communicatively coupled to the controller; rendering a determination from the data of whether the first or second trigger conditions are met.

In addition to one or more of the above disclosed aspects of the method, or as an alternate, controlling the divider system includes: receiving data transmitted from a mobile device over a network, wherein the data is indicative of, at a landing: a pet; a passenger count; furniture; equipment; or personal belongings; rendering a determination from the data of whether the first or second trigger conditions are met.

In addition to one or more of the above disclosed aspects of the method, or as an alternate, the method includes controlling a sensor in one of the zones and a display in another one of the zones so that, when the divider system is deployed, images or video captured from the one of the zones is displayed in the other one of the zones via the display.

In addition to one or more of the above disclosed aspects of the method, or as an alternate, the method includes preventing more than one of the front and aft doors from opening at a landing when the divider system is in the retracted state.

In addition to one or more of the above disclosed aspects of the method, or as an alternate, the method includes controlling front and aft balanced ventilation systems of the front and aft zones when the divider system is in the deployed state.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
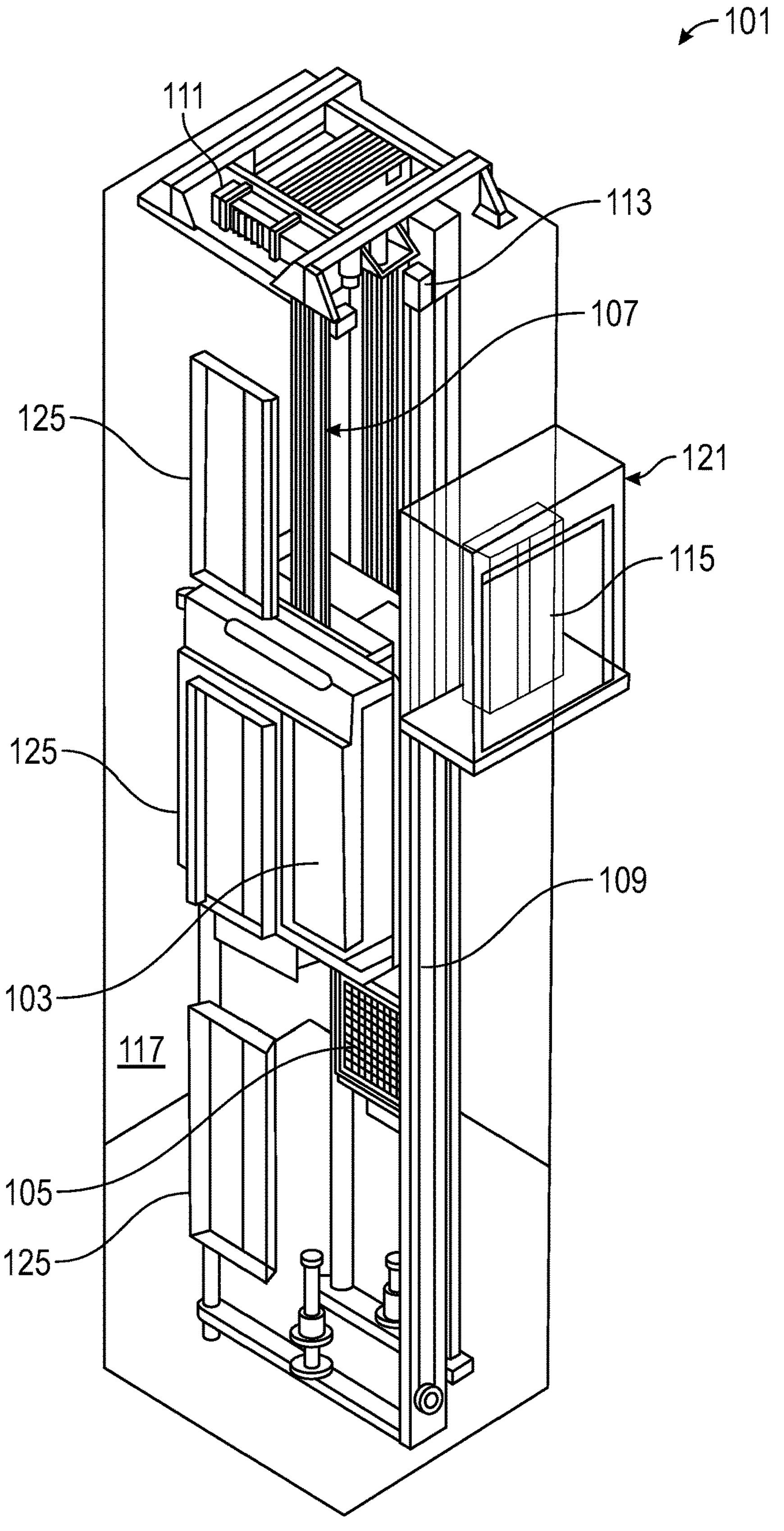
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail (or rail system) 109, a machine (or machine system) 111, a position reference system 113, and an electronic elevator controller (controller) 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft (or hoistway) 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. Embodiments may also be employed in ropeless elevator systems using self-propelled elevator cars (e.g., elevator cars equipped with friction wheels, pinch wheels or traction wheels). FIG. 1 is merely a non-limiting example presented for illustrative and explanatory purposes.

Turning to FIGS. 2-5, additional aspects of the elevator system 101 are shown. The system 101 includes the elevator car 103 that includes a front end 200A that includes a front doorway 210A. An aft end 200B includes an aft doorway 210B. A cabin 103A extends from the front end 200A to the aft end 200B. A divider system 220, or partition, is operationally coupled to the elevator car 103 within the cabin 103A, intermediate the front end 200A and aft end 200B. The divider system 220 is operational to transition between two states, including a deployed state and a retracted state. In the retracted state, the cabin 103A is undivided between the front end 200A and aft ends 200B. In the deployed state, the divider system 220 divides the cabin 103A into a front zone 230A accessible by the front doorway 210A and an aft zone 230B accessible by the aft doorway 210B. A cabin operating panel 232A is also shown at the front end 200A. An additional panel 232B may be provided in the aft end 200B so that elevator implements may be controlled via either operating panel 232 when the divider system 220 is in the deployed state.

Figure 2:
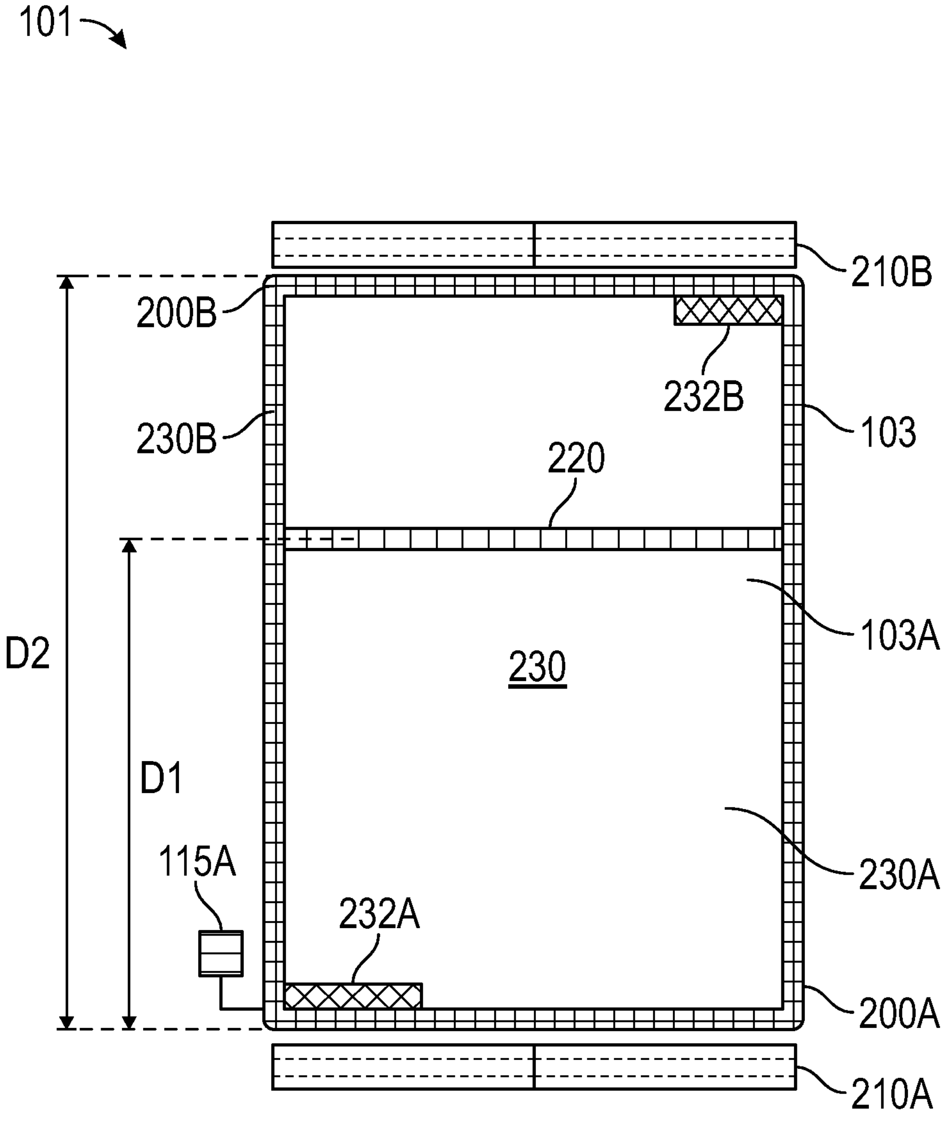
FIG. 2 shows an elevator car with a divider system according to an embodiment, where the divider system is shown as a removable partition.
Figure 3:
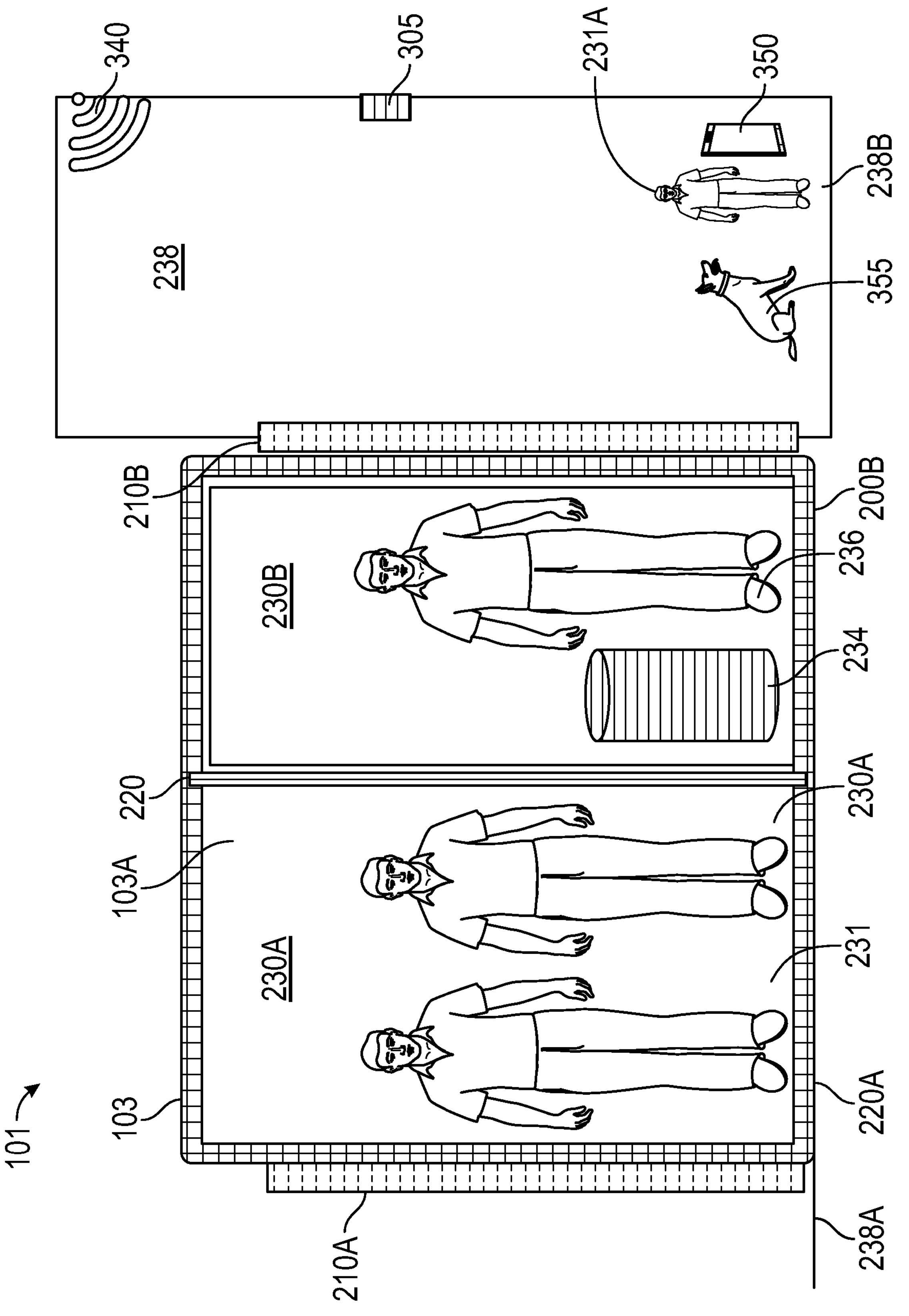
FIG. 3 shows the elevator car with a divider system, where the elevator car is transporting passengers, a maintenance robot and staff.

As shown in FIGS. 2 and 3, in one embodiment the divider system 220 is positioned closer to the aft doorway 210B so that the aft zone 230B is smaller than the front zone 230B. For example, size D1 of the front zone 230A may be 55 to 75 percent of the total front to aft span D2 of the cabin 103A. This may be helpful if the front zone 230A is primarily used for passengers 231 and the aft zone is primarily used, e.g., for robots 234, service staff 236, a person with a pet, etc. In one embodiment, the divider system 220 is a removable partition wall.

A controller 115A may be on board the elevator car 103 and operationally coupled to the divider system 220. Alternatively, the controller may be the same as controller 115 in FIG. 1, though for purposes of this disclosure reference will be made to the onboard controller 115A. The controller 115A may be in the front or aft panels 232A, 232B, or in both for redundancy purposes. The controller 115A may be configured to control the divider system 220 to transition between the deployed state and the retracted state. The controller 115A may be operationally coupled to the front doorway 220A and aft doorway 210B and configured to prevent more than one of the front and aft doorways 210A, 210B from opening at landing 238, e.g., front and aft landings 238A, 238B, when the divider system 220 is in the retracted state. This would prevent passengers from exiting on the wrong side of the elevator car 103.

Figure 4:
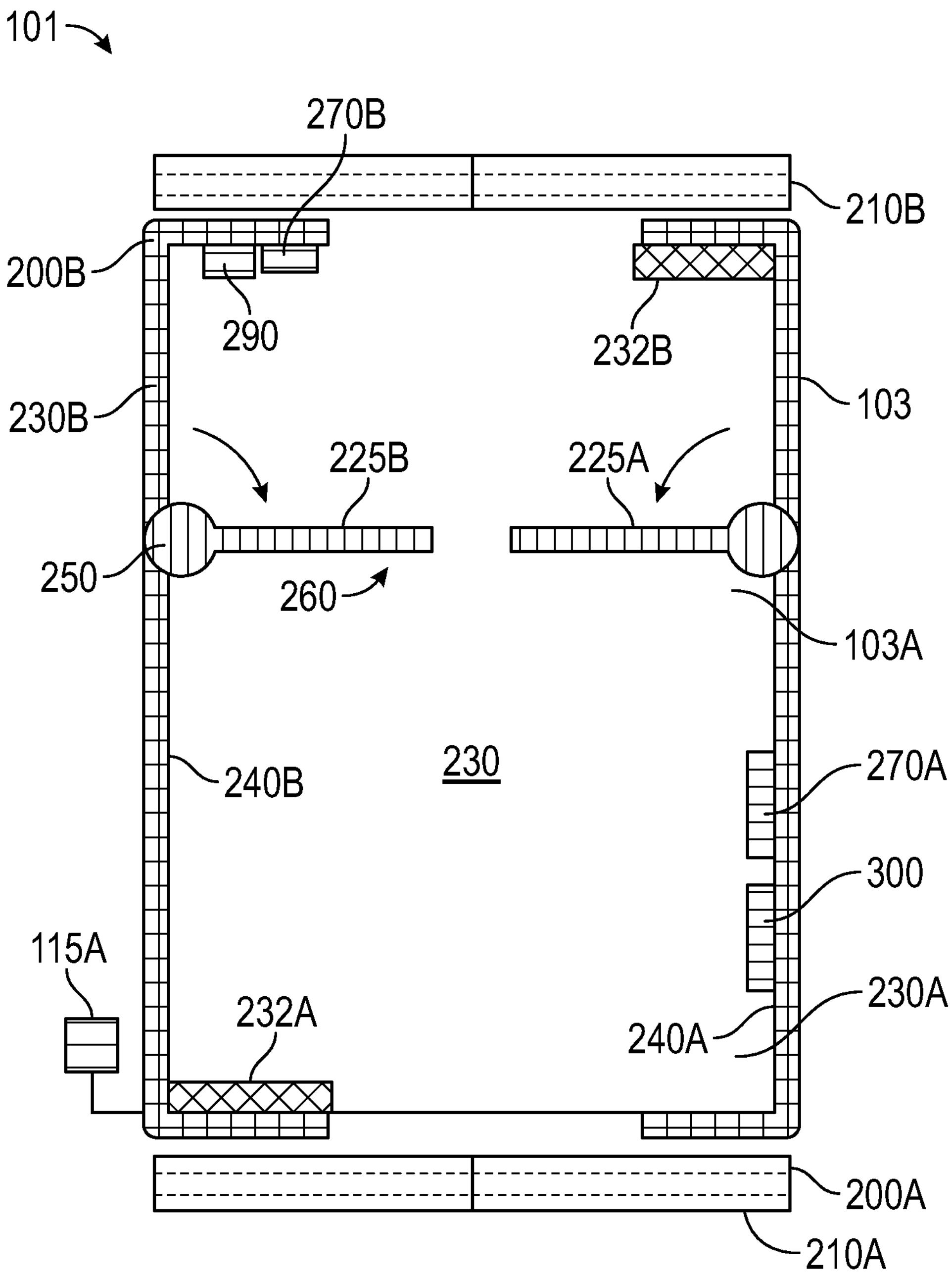
FIG. 4 shows an elevator car with a divider system according to an embodiment, where the divider system is includes pivotal doors in a deployed state.
Figure 5:
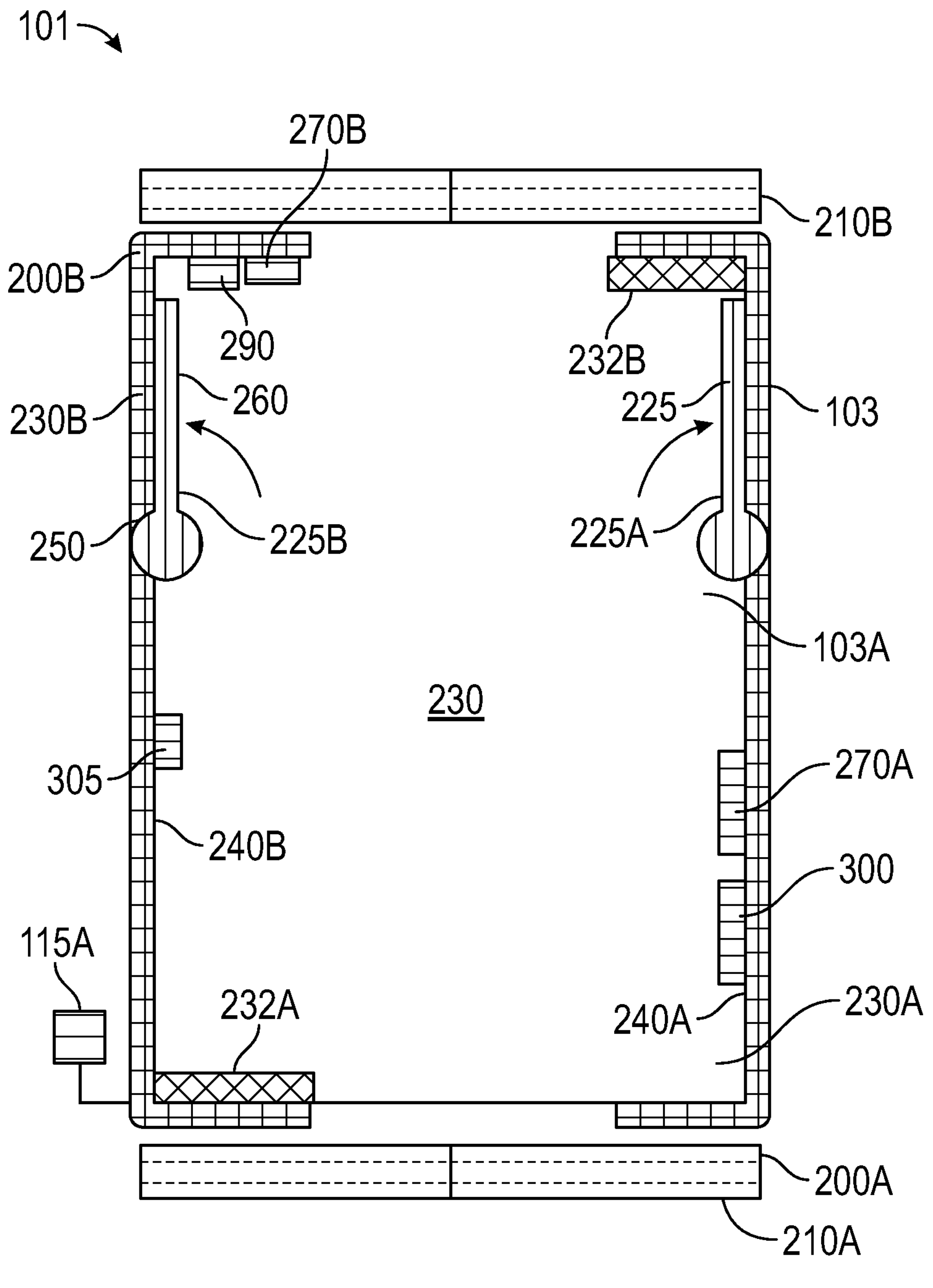
FIG. 5 shows an elevator car with a divider system according to an embodiment, where the divider system is includes pivotal doors in a retracted state.

Turing to FIGS. 4 and 5, in one embodiment the divider system 220 includes doors 225, which may be pivotal doors, operationally coupled to the controller 115A. That is, the cabin 103A includes a first sidewall 240A and a second sidewall 240B extending from the front end 200A to aft end 200B. The doors 225 include a first door 225A operationally coupled to the first sidewall 240A and a second door 225B operationally coupled to the second sidewall 240B. The doors 225 may be equipped with automated swing door operators 250 which are operationally coupled to the controller 115A.

In one embodiment, the doors 225 include gaskets or seals 260 around their respective perimeters. The front zone 230A and aft zone 230B of the elevator car 103 may respectively include front and aft balanced ventilation systems 270A, 270B that are operationally controlled by the controller 115A. That is, the front zone 230A and aft zone 230B may each include dual fans to draw air into and out of the zones 230 when the doors 225 are in the deployed state. The controller 115A may be configured to operate the ventilation systems 270A, 270B when the divider system is in the deployed state. Due to the seals 260 and ventilation systems 270A, 270B, conditions of air within one of the zones 230 may be prevented from affecting the other one of the zones 230. For example, odors, dust and other allergens that may be in one of the zones 230 may be prevented from affecting the other one of the zones 230.

As shown in FIG. 4, in the elevator cabin 103A, one of the zones 230 may be provided with an image sensor 290 (or first sensor, which may be a charge-coupled device or CCD used for digital imagery) and the other one of the zones 230 may be provided with a video display 300, each of which may be operationally connected to the controller 115A. When the divider system 220 is deployed, the controller 115A may control the image sensor 290 and display 300 so that image information captured by the image sensor 290 is displayed on the display 300. For example, the image sensor 290 may be in the second zone 230B and the display may be in the first zone 230A. With the divider system 220 in the deployed state, passengers in the first zone 230A would be comfortable knowing what is currently occurring, such as who or what is being transported, in the second zone 230B. Of course, both zones 230 may be equipped with image sensors and displays to allow passengers in each one of the zones 230 see displayed information about what is occurring in the other one of the zones 230. Alternatively, the divider system 220 may have a transparent portion, such as a window, to provide a similar effect, to provide persons in one of the zones with visual access to the other one of the zones when the divider system is deployed.

In one embodiment, the controller 115A may be configured to transition the divider system 220 to the deployed state from the retracted state when a first trigger condition is met. For example, the controller 115A may be configured to determine that the first trigger condition is met when a pet or robot enters the elevator car 103. The controller 115A may also be configured to transition the divider system 220 to the retracted state from the deployed state when a second trigger condition is met. The second trigger condition may be met when any of a passenger count, furniture, equipment or personal belongings that are larger than a predetermined size enters the elevator car 103. Equipment may include a hospital bed, and personal belongings may include, e.g., luggage. In one embodiment, the display 300 may indicate that certain equipment, cargo, maintenance crew, and, e.g., passengers with pets, should be located the aft zone 230B during normal elevator usage.

Turning to FIGS. 3 and 5, in one embodiment, a second sensor 305 is onboard the elevator car 103 or at a landing 238B. The second sensor 305 may be operationally connected to the controller 115A. The second sensor 305 may be connected to the controller 115A via wireless or wired connections identified below. The controller 115A may be configured to receive sensor data from the second sensor 305. From the sensor data, the controller 115A may be configured to render a determination of whether the first or second trigger conditions are met and transition the divider system 220 to the deployed or retracted state responsive to the determination. For example, with the sensor data, the controller 115A may be configured to identify a general size, based on overall geometry, of a passenger count, furniture, equipment, etc., exceeds the size available in a divided cabin 103A when the divider system 220 is deployed. For example the sensor 305 may utilize LIDAR (light detection and ranging). With this determination the controller 115A may retract the divider system 220. In an embodiment, the sensor 290 may be an RFID or similar sensor that the controller 115A may utilize to identify via RF communications that a maintenance robot or hospital stretcher is going to enter the elevator car 103.

Turning back to FIG. 3, in one embodiment, the controller 115A may communicate over a wireless network 340 (identified below) and receive sensor data if the sensor 305 is located at the landing 238. From the sensor data, the controller 115A may determine that the first or second trigger conditions will be met at the landing prior to stopping at the landing. For example, a mobile device 350, such as a mobile phone, of a passenger 231A at the landing may include a software application which allows the passenger 231A to both call the elevator car 103 to the landing and indicate that a pet 355 is being brought onto the elevator car 103. Alternatively, the mobile device may allow the passenger to enter passenger count or indicate whether furniture or equipment is going to enter the elevator car 103 at the landing. Also, a maintenance robot 234 may be able to communicate autonomously over the wireless network with the controller 115A to indicate it is entering at the landing 238B. With this information, the controller 115A can transition the divider system 220 to the deployed or retracted state when, or prior to, stopping at the landing 238B, responsive to the appropriate determination.

Figure 6:
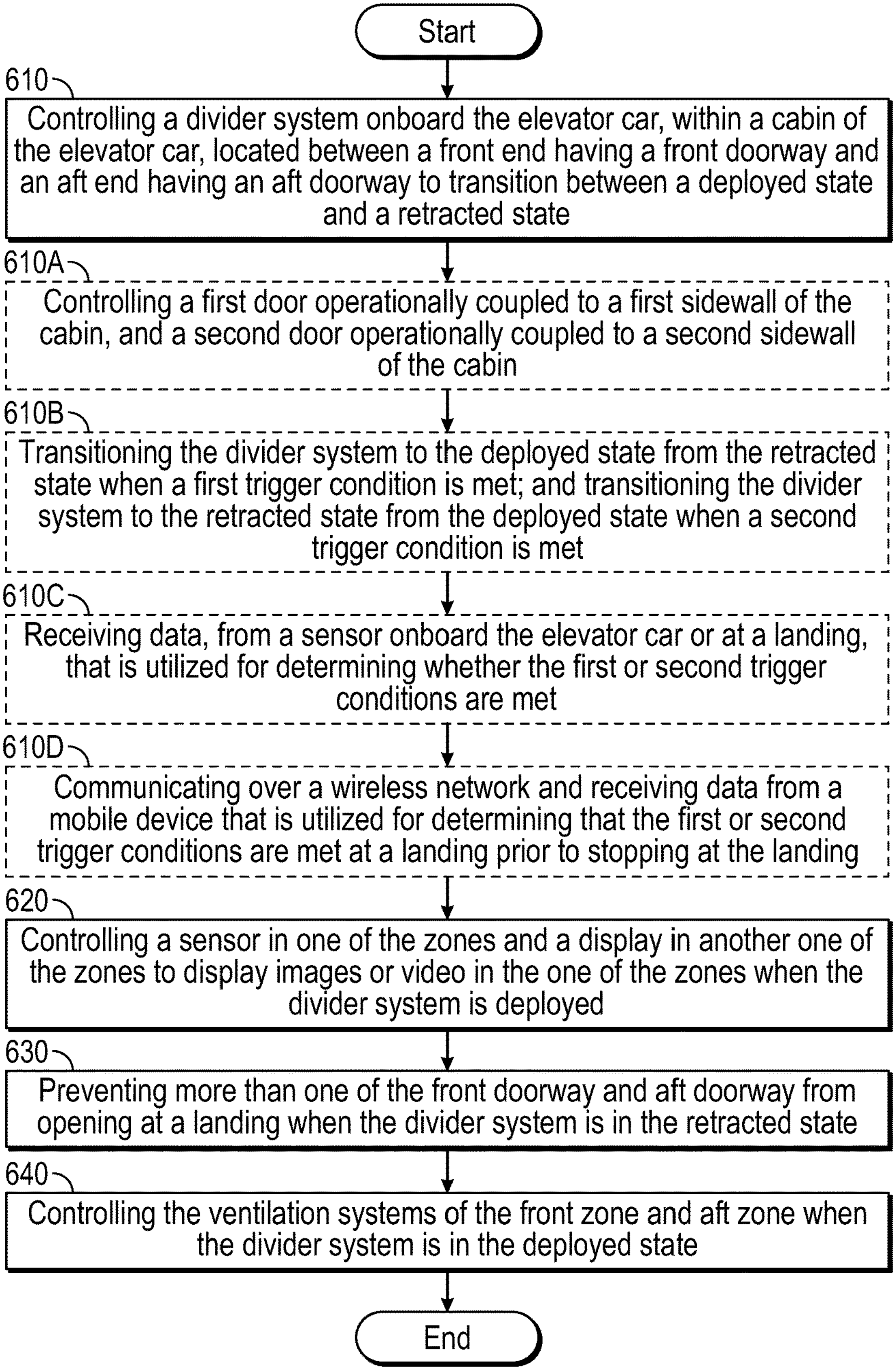
FIG. 6 is a flowchart showing a method of operating an elevator car with a divider system.

Turning to FIG. 6, a flowchart shows method of operating an elevator system 101 with a controller 115A operationally connected to an elevator car 103. As shown in block 610, the method includes controlling a divider system 220 onboard the elevator car 103, within a cabin 103A of the elevator car 103, located between a front end 200 having a front doorway 210 and an aft end having an aft doorway 210. Such controlling includes controlling the divider system 220 to transition between a deployed state and a retracted state. In the retracted state, the cabin 103A is undivided. In the deployed state, the divider system 220 divides the cabin 103A into a front zone 230 accessible by the front doorway 210 and an aft zone 230 accessible by the aft doorway 210.

As shown in block 610A, controlling the divider system 220 may include controlling a first door 225A operationally coupled to a first sidewall 240 of the cabin 103A, and a second door 225B operationally coupled to a second sidewall 240 of the cabin 103A. As shown in block 610B, controlling the divider system 220 may include transitioning the divider system 220 to the deployed state from the retracted state when a first trigger condition is met. In an example, the controller determines that the first trigger condition is met when a pet or robot enters the elevator car. As further shown in block 620B, this step may include transitioning the divider system to the retracted state from the deployed state when a second trigger condition is met. In an example, the controller determines that the second trigger condition is met when one or more of a passenger count, furniture, equipment or personal belongings that are larger than a predetermined size enters the elevator cabin 103A. As shown in block 610C, controlling the divider system 220 may include receiving data, from a sensor 305 onboard the elevator car 103 or at a landing 238B, that is utilized for determination whether the first or second trigger conditions are met. As shown in block 610D, controlling the divider system 220 may include communicating over a wireless network 340 and receiving data from a mobile device 350 that is utilized for determining that the first or second trigger conditions are met at a landing 238B prior to stopping at the landing 238B.

As shown in bock 620, the method may include controlling an image sensor 290 in one of the zones 230 and a display 300 in another one of the zones 230 to display images or video of the one of the zones 230 when the divider system 220 is deployed. As shown in block 630, the method may include preventing more than one of the front doorway 210A and aft doorway 210B from opening at a landing 310 when the divider system 220 is in the retracted state. As shown in block 640, the method may include controlling the ventilation systems 270A, 270B of the front zone 230A and aft zone 230B when the divider system 220 is in the deployed state.

Figure 7:
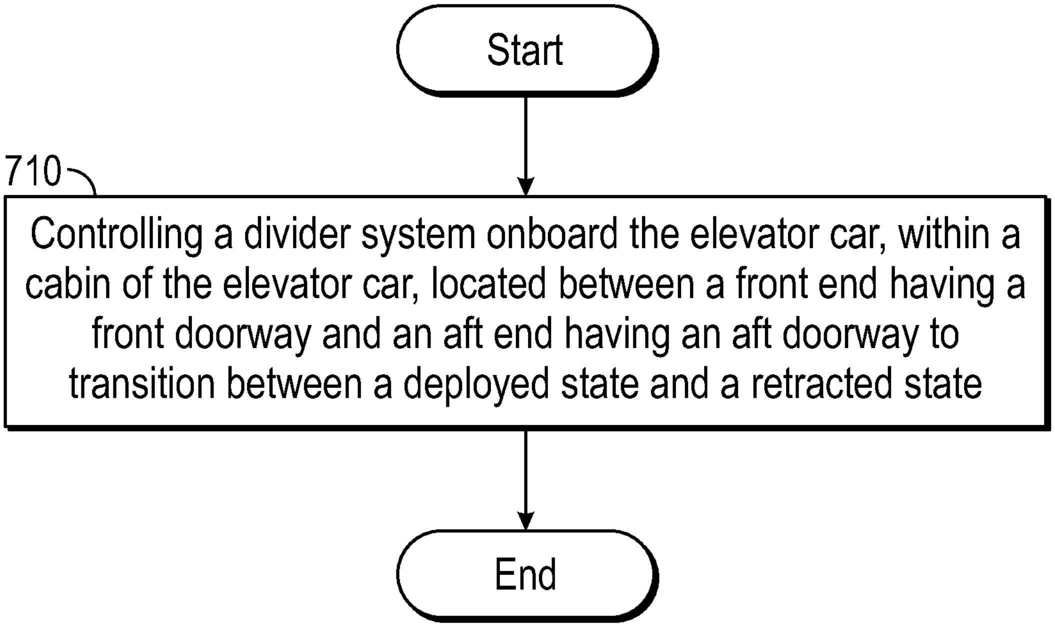
FIG. 7 is another flowchart showing the method of operating the elevator car with the divider system.

Turning to FIG. 7, generally, as shown in block 710, the method is directed to controlling the divider system 220 onboard the elevator car 103, within the cabin 103A of the elevator car 103, located between the front end 200 having the front doorway 210 and the aft end having the aft doorway 210 to transition between the deployed state and the retracted state. In the retracted state, the cabin 103A is undivided. As indicated, in the deployed state, the divider system 220 divides the cabin 103A into a front zone 230 accessible by the front doorway 210 and an aft zone 230 accessible by the aft doorway 210.

Sensor data identified herein may be obtained and processed separately, or simultaneously and stitched together, or a combination thereof, and may be processed in a raw or complied form. The sensor data may be processed on the sensor (e.g. via edge computing), by controllers identified or implicated herein, on a cloud service, or by a combination of one or more of these computing systems. The senor may communicate the data via wired or wireless transmission lines, applying one or more protocols as indicated below.

Wireless connections may apply protocols that include local area network (LAN, or WLAN for wireless LAN) protocols. LAN protocols include WiFi technology, based on the Section 802.11 standards from the Institute of Electrical and Electronics Engineers (IEEE). Other applicable protocols include Low Power WAN (LPWAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance, and is a media access control (MAC) layer protocol for transferring management and application messages between a network server and application server, respectively. LAN and WAN protocols may be generally considered TCP/IP protocols (transmission control protocol/Internet protocol), used to govern the connection of computer systems to the Internet. Wireless connections may also apply protocols that include private area network (PAN) protocols. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same.

Wireless connections may also include radio-frequency identification (RFID) technology, used for communicating with an integrated chip (IC), e.g., on an RFID smartcard. In addition, Sub-1 Ghz RF equipment operates in the ISM (industrial, scientific and medical) spectrum bands below Sub 1 Ghz—typically in the 769-935 MHz, 315 Mhz and the 468 Mhz frequency range. This spectrum band below 1 Ghz is particularly useful for RF IOT (internet of things) applications. The Internet of things (IoT) describes the network of physical objects—"things"—that are embedded with sensors, software, and other technologies for the purpose of connecting and exchanging data with other devices and systems over the Internet. Other LPWAN-IOT technologies include narrowband internet of things (NB-IOT) and Category M1 internet of things (Cat M1-IOT). Wireless communications for the disclosed systems may include cellular, e.g. 2G/3G/4G (etc.). Other wireless platforms based on RFID technologies include Near-Field-Communication (NFC), which is a set of communication protocols for low-speed communications, e.g., to exchange date between electronic devices over a short distance. NFC standards are defined by the ISO/IEC (defined below), the NFC Forum and the GSMA (Global System for Mobile Communications) group. The above is not intended on limiting the scope of applicable wireless technologies.

Wired connections may include connections (cables/interfaces) under RS (recommended standard)-422, also known as the TIA/EIA-422, which is a technical standard supported by the Telecommunications Industry Association (TIA) and which originated by the Electronic Industries Alliance (EIA) that specifies electrical characteristics of a digital signaling circuit. Wired connections may also include (cables/interfaces) under the RS-232 standard for serial communication transmission of data, which formally defines signals connecting between a DTE (data terminal equipment) such as a computer terminal, and a DCE (data circuit-terminating equipment or data communication equipment), such as a modem. Wired connections may also include connections (cables/interfaces) under the Modbus serial communications protocol, managed by the Modbus Organization. Modbus is a master/slave protocol designed for use with its programmable logic controllers (PLCs) and which is a commonly available means of connecting industrial electronic devices. Wireless connections may also include connectors (cables/interfaces) under the PROFibus (Process Field Bus) standard managed by PROFIBUS & PROFINET International (PI). PROFibus which is a standard for fieldbus communication in automation technology, openly published as part of IEC (International Electrotechnical Commission) 61158. Wired communications may also be over a Controller Area Network (CAN) bus. A CAN is a vehicle bus standard that allow microcontrollers and devices to communicate with each other in applications without a host computer. CAN is a message-based protocol released by the International Organization for Standards (ISO). The above is not intended on limiting the scope of applicable wired technologies.

When data is transmitted over a network between end processors as identified herein, the data may be transmitted in raw form or may be processed in whole or part at any one of the end processors or an intermediate processor, e.g., at a cloud service (e.g. where at least a portion of the transmission path is wireless) or other processor. The data may be parsed at any one of the processors, partially or completely processed or complied, and may then be stitched together or maintained as separate packets of information. Each processor or controller identified herein may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory identified herein may be but is not limited to a random access memory (RAM), read only memory (ROM), or other electronic, image, magnetic or any other computer readable medium.

The controller may further include, in addition to a processor and non-volatile memory, one or more input and/or output (I/O) device interface(s) that are communicatively coupled via an onboard (local) interface to communicate among other devices. The onboard interface may include, for example but not limited to, an onboard system bus, including a control bus (for inter-device communications), an address bus (for physical addressing) and a data bus (for transferring data). That is, the system bus may enable the electronic communications between the processor, memory and I/O connections. The I/O connections may also include wired connections and/or wireless connections identified herein. The onboard interface may have additional elements, which are omitted for simplicity, such as controllers, buffers (caches), drivers, repeaters, and receivers to enable electronic communications. The memory may execute programs, access data, or lookup charts, or a combination of each, in furtherance of its processing, all of which may be stored in advance or received during execution of its processes by other computing devices, e.g., via a cloud service or other network connection identified herein with other processors.

Embodiments can be in the form of processor-implemented processes and devices for practicing those processes, such as processor. Embodiments can also be in the form of computer code based modules, e.g., computer program code (e.g., computer program product) containing instructions embodied in tangible media (e.g., non-transitory computer readable medium), such as floppy diskettes, CD ROMs, hard drives, on processor registers as firmware, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:
an elevator car, the elevator car including:
a front end that includes a front doorway;
an aft end that includes an aft doorway; and
a cabin extending from the front end to the aft end; and
a divider system operationally coupled to the elevator car within the cabin, intermediate the front and aft ends, that is operational to transition between:
a retracted state, where the cabin is undivided; and
a deployed state where the divider system divides the cabin into a front zone that is accessible by the front doorway and an aft zone that is accessible by the aft doorway,
a controller onboard the elevator car, operationally coupled to the divider system and configured to control the divider system to transition between the deployed state and the retracted state.

2. The system of claim 1, wherein:
one of the zones includes a sensor operationally coupled to the controller and other one of the zones includes a video display that is operationally coupled to the controller, and
the controller is configured to control the sensor and display so that, when the divider system is deployed, images or video captured from the one of the zones is displayed in the other one of the zones via the display.

3. The system of claim 1, wherein
the divider system includes a transparent portion to provide persons in one of the zones with visual access to the other one of the zones when the divider system is deployed.

4. The system of claim 1, wherein
the cabin includes a first sidewall and a second sidewall; and
the divider system includes: a first door operationally coupled to the first sidewall; and a second door operationally coupled to the second sidewall.

5. The system of claim 4, wherein:
the doors comprise seals around their respective perimeters;
the front and aft zones of the elevator car respectively include front and aft balanced ventilation systems that are operationally controlled by the controller,
wherein the controller is configured to operate the front and aft balanced ventilation systems when the divider system is in the deployed state.

6. The system of claim 1, wherein
the controller is configured to:
transition the divider system to the deployed state from the retracted state upon rendering a determination that a first trigger condition is met; and
transition the divider system to the retracted state from the deployed state upon rendering a determination that a second trigger condition is met.

7. The system of claim 6, wherein
the controller is configured to determine one or more of:
the first trigger condition is met when a pet or robot enters the elevator car; or
the second trigger condition is met when one or more of a passenger count, furniture, equipment or personal belongings that are larger than a predetermined size enters the elevator car.

8. The system of claim 6, wherein
the controller is configured to receive data from one or more of:
a sensor onboard the elevator car or at a landing, operationally connected to the controller; or
a wireless network that is communicatively coupled with the controller; and
the controller is configured to:
render a determination from the data of whether the first or second trigger conditions are met.

9. The system of claim 8, wherein
the controller is configured to:
determine from the data received over the wireless network that the first or second trigger conditions will be met at a landing prior to stopping at the landing; and
transition the divider system to the deployed state or the retracted state when, or prior to, stopping at the landing, responsive to the determination.

10. The system of claim 1, wherein
the controller is operationally coupled to the front and aft doors and configured to prevent more than one of the front and aft doors from opening at a landing when the divider system is in the retracted state.

11. A method of operating an elevator system with a controller operationally connected to an elevator car, the method comprising:
controlling a divider system onboard the elevator car, within a cabin of the elevator car, between a front end having a front doorway and an aft end having an aft doorway, to transition between a deployed state and a retracted state, wherein
in the retracted state, the cabin is undivided; and
in the deployed state, the divider system divides the cabin into a front zone that is accessible by the front doorway and an aft zone that is accessible by the aft doorway,
wherein the controller is onboard the elevator car and operationally coupled to the divider system.

12. The method of claim 11, wherein
controlling the divider system includes controlling a first door operationally coupled to a first sidewall of the cabin, and a second door operationally coupled to a second sidewall of the cabin.

13. The method of claim 12, wherein
controlling the divider system includes:
transitioning the divider system to the deployed state from the retracted state upon rendering a determination that a first trigger condition is met; and
transitioning the divider system to the retracted state from the deployed state upon rendering a determination that a second trigger condition is met.

14. The method of claim 13, wherein
controlling the divider system includes:
rendering a determination that the first trigger condition is met when a pet or robot enters the elevator car; and
rendering a determination that the second trigger condition is met when one or more of a passenger count, furniture, equipment or personal belongings that are larger than a predetermined size enters the elevator car.

15. The method of claim 13, wherein
controlling the divider system includes:
receiving data, from one or more of:
a sensor onboard the elevator car or at a landing that is operational coupled to the controller; and
a network communicatively coupled to the controller; and
rendering a determination from the data of whether the first or second trigger conditions are met.

16. The method of claim 13, wherein controlling the divider system includes:

receiving data transmitted from a mobile device over a network, wherein the data is indicative of, at a landing: a pet; a passenger count; furniture; equipment; or personal belongings;

rendering a determination from the data of whether the first or second trigger conditions are met.

17. The method of claim 11, comprising controlling a sensor in one of the zones and a display in another one of the zones so that, when the divider system is deployed, images or video captured from the one of the zones is displayed in the other one of the zones via the display.

18. The method of claim 11, comprising preventing more than one of the front and aft doors from opening at a landing when the divider system is in the retracted state.

19. The method of claim 11, comprising controlling front and aft balanced ventilation systems of the front and aft zones when the divider system is in the deployed state, accessible by the aft doorway.

* * * * *